F. G. FORD.
Flour-Sifter.
No. 222,265. Patented Dec. 2, 1879.
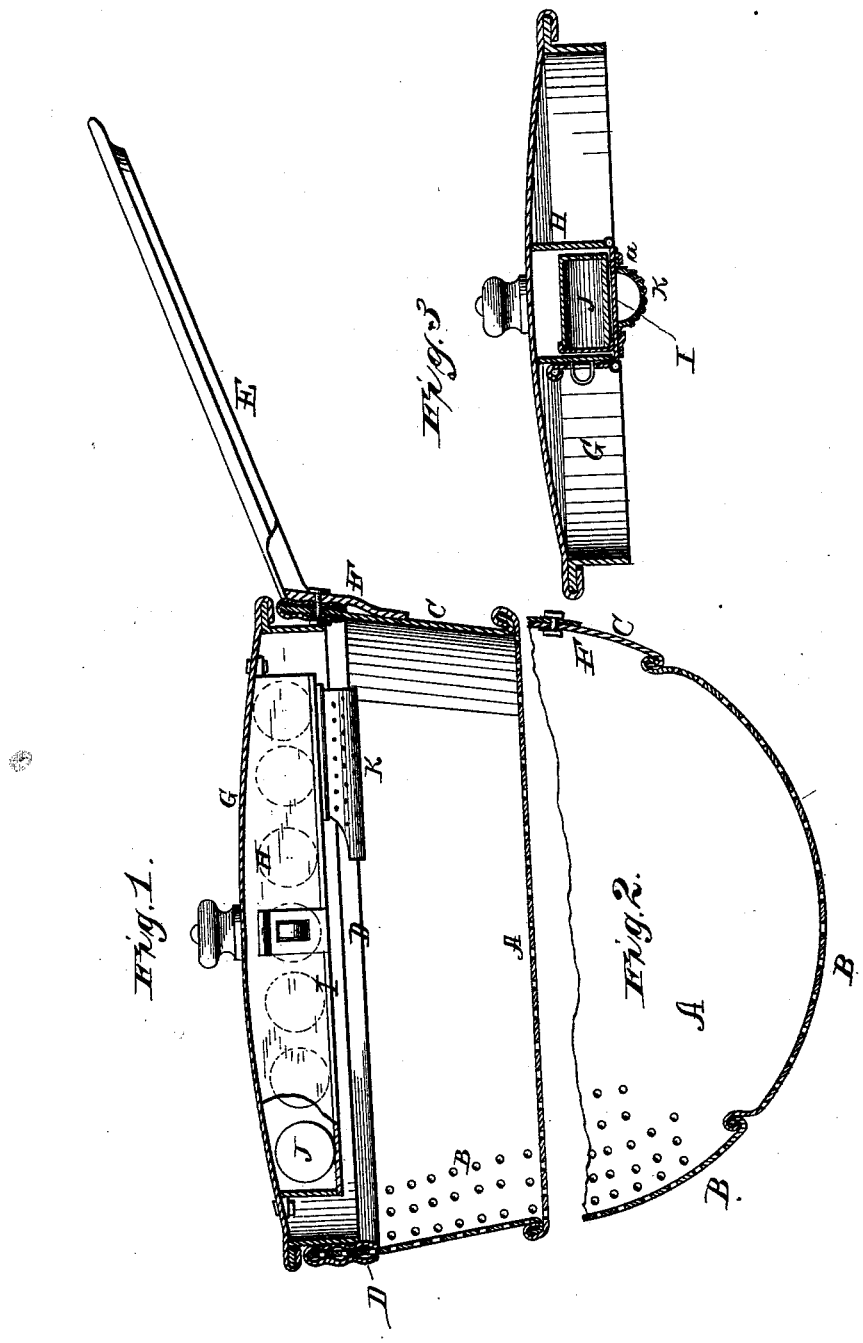
WITNESSES
F. L. Ouraud
Harry Aubrey Toulmin
INVENTOR
F. G. Ford
Alexander Maton
ATTORNEYS

UNITED STATES PATENT OFFICE.

FREDERIC G. FORD, OF PHILADELPHIA, PENNSYLVANIA.

IMPROVEMENT IN FLOUR-SIFTERS.

Specification forming part of Letters Patent No. 222,265, dated December 2, 1879; application filed May 15, 1879.

*To all whom it may concern:*

Be it known that I, FREDERIC G. FORD, of Philadelphia, in the county of Philadelphia, and in the State of Pennsylvania, have invented certain new and useful Improvements in Flour-Sifters; and I do hereby declare that the following is a full, clear, and exact description thereof, reference being had to the accompanying drawings, and to the letters of reference marked thereon, making a part of this specification.

The nature of my invention consists in the construction and arrangement of a flour-sifter, as will be hereinafter more fully set forth.

In order to enable others skilled in the art to which my invention appertains to make and use the same, I will now proceed to describe its construction and operation, referring to the annexed drawings, in which—

Figure 1 is a longitudinal section of my flour-sifter. Fig. 2 is a detailed horizontal section of the same, and Fig. 3 is a cross-section of the lid.

A represents the bottom, and B the body, of the flour-sifter, made of perforated sheet metal, except a certain portion, C, at the back, which is left unperforated, and to this portion C of the sifter-body the handle E is attached. The handle E has a plate, F, formed with it at its inner end, and this plate is riveted to the part C of the sifter.

When the body and bottom are made of more than one piece they are united by double-seaming, or in any other suitable manner that will obviate the necessity of using solder.

The form or shape of the sifter is immaterial. It may be of the round form shown in the drawings, or of any other desired shape, and has around the top edge a rim or band, D, formed with or united to the body.

It will be noticed that the bottom and major part of the body of my flour-sifter are made of perforated sheet metal, which can easily be cleansed in case of clogging, and the sifting is done not only at or through the bottom, but also through the sides.

The imperforate part C of the sifter-body prevents the flour from coming out on the hand of the person using the sifter.

There is no solder used in the manufacture of my sifter; hence, if desired, it can be used also as a steamer, or for other culinary purposes, without any liability of the same giving way, which is always more or less the case when solder is used for uniting the various parts.

When used as a steamer, or for similar purpose, the top rim or bead, D, will support it in or on the kettle or other vessel with which it may be used, and the imperforate part C of the body prevents the steam from escaping and burning or scalding the operator's hand while handling the device.

G represents the lid of the sifter. On the inside of this lid is, by any suitable means, attached a box, H, provided with a lid, I, which may be hinged to the box and fastened by a hasp, catch, or other suitable or convenient means. In this box are placed a number of smaller boxes, J, for containing various spices, and on the lid I of the box are formed guides *a a*, in which a grater, K, is inserted. This forms a convenient and handy receptacle for the various spices used in a family, as it is always with the sifter, and at hand just at the time when wanted.

The sifter, as above stated, can also be used as a steamer, and in distributing paris-green on potato-plants, and for many other purposes.

Having thus fully described my invention, what I claim as new, and desire to secure by Letters Patent, is—

1. In a sifter having perforated bottom and perforated body, the imperforated part C, having the handle attached thereto, substantially as and for the purposes herein set forth.

2. The combination of the perforated bottom A, perforated body B, with imperforate part C, the top rim, D, and handle E, substantially as and for the purposes herein set forth.

3. In combination with the lid G and box H, having lid I, the guides *a a*, for receiving and holding a grater, K, substantially as herein set forth.

In testimony that I claim the foregoing I have hereunto set my hand this 15th day of March, 1879.

FREDERIC G. FORD.

Witnesses:
THOS. A. ALLISON,
A. ELLWOOD JONES.